United States Patent [19]
Ramanathan et al.

[11] 3,843,622
[45] Oct. 22, 1974

[54] BASIC MONAZO COMPOUNDS CONTAINING A QUATERNATED HYDRAZIDE GROUP

[75] Inventors: Visvanathan Ramanathan, Basel; Hans Wilhelm Liechti, Oberwil/bl, both of Switzerland

[73] Assignee: Ciba-Geigy AG, Basel, Switzerland

[22] Filed: Feb. 10, 1972

[21] Appl. No.: 225,274

Related U.S. Application Data

[63] Continuation-in-part of Ser. No. 17,317, March 6, 1970, abandoned, which is a continuation-in-part of Ser. No. 648,204, June 23, 1967, abandoned.

[30] Foreign Application Priority Data

June 24, 1966 Switzerland................... 9189/66

[52] U.S. Cl.......... 260/149, 260/146 R, 260/146 D, 260/146 T, 260/147, 260/148, 260/149, 260/152, 260/153, 260/154, 260/155, 260/156, 260/157, 260/158, 260/162, 260/163, 260/165, 260/186, 260/187, 260/544 Y, 260/151, 260/196, 260/556 AR, 260/207, 260/207.1, 260/558 H, 260/208, 260/561 A, 260/293.76, 260/377, 260/397.7, 260/456 A, 260/562 R, 260/459, 260/562 AA, 260/465 D, 260/472, 260/479 S, 260/501.21

[51] Int. Cl...................... C09b 29/06, C09b 29/08, C09b 51/00

[58] Field of Search ........ 260/149, 207, 207.1, 196, 260/151

[56] References Cited
UNITED STATES PATENTS

| | | | |
|---|---|---|---|
| 2,357,317 | 9/1944 | Dickey et al................ | 260/207.1 X |
| 2,955,108 | 10/1960 | Omietanski.................. | 260/205 |
| 3,148,181 | 9/1964 | Wallace et al................ | 260/207 |
| 3,252,965 | 5/1966 | Entschel et al............... | 260/149 X |

Primary Examiner—Lorraine A. Weinberger
Assistant Examiner—C. F. Warren
Attorney, Agent, or Firm—Joseph G. Kolodny; Edward McC. Roberts; Prabodh I. Almaula

[57] ABSTRACT

A water-soluble basic dyestuff which corresponds to the formula

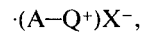

in which A represents the radical of a monoazo- or disazo dyestuff which may contain no other substituents than lower alkyl, trifluoromethyl, lower alkoxy, chlorine, bromine, cyano, nitro, phenylazo, lower alkoxycarbonyl, lower alkanecarbonyl, lower alkanesulfonyl, acylamino and sulfonic acid amide, or the radical of an amino- or hydroxyanthraquinone dyestuff which may contain no other substituents than lower alkyl, lower alkoxy, chlorine, bromine, cyano, nitro, lower alkoxycarbonyl, lower alkanecarbonyl, lower alkanesulfonyl, acylamino and sulfonic acid amide, or the radical of a styryl dyestuff which may contain no other substituents than lower alkyl, lower alkoxy, cyano and lower alkoxy carbonyl or the radical of a nitro dyestuff which may contain no other substituents than lower alkyl, lower alkoxy, chlorine, bromine, cyano, nitro, lower alkoxycarbonyl, lower alkanecarbonyl, lower alkanesulfonyl and sulfonic acid amide, Q represents a quaternated hydrazide group of the formula

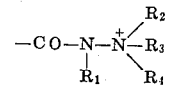

wherein $R_1$ represents lower alkyl or hydrogen, $R_2$, $R_3$ and $R_4$ each represents lower alkyl and X represents an anion, and in which formula one of the symbols $R_2$, $R_3$ and $R_4$ may represent a benzyl or a phenyl residue, and wherein "aryl" means unsubstituted phenyl or phenyl substituted by lower alkyl, lower alkoxy, chlorine or bromine and "lower" means containing up to 4 carbon atoms. They are valuable dyestuffs yielding on synthetic fibres dyeable by cationic dyestuffs, especially polyacrylonitrile fibres dyeings of good general fastness.

6 Claims, No Drawings

BASIC MONAZO COMPOUNDS CONTAINING A QUATERNATED HYDRAZIDE GROUP

CROSS-REFERENCE TO RELATED APPLICATIONS

This is a continuation in part of application Ser. No. 17,317, filed Mar. 6, 1970, now abandoned, which was a continuation in part of application Ser. No. 648,204, filed June 23, 1967, now abandoned.

The present invention provides new dyestuffs which are free from acidic groups imparting solubility in water, particularly sulphonic acid and carboxyl groups, and which contain at least one quaternary acid hydrazide radical, especially dyestuffs of the formula (1) 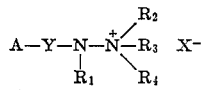

in which A represents the radical of a dyestuff free from sulphonic acid and carboxylic acid groups, Y represents a bridging group of the formula —CO—, $R_1$ represents a low-molecular alkyl residue or preferably a hydrogen atom, $R_2$, $R_3$ and $R_4$ each represents a low-molecular alkyl residue, preferably a methyl residue, and one of the symbols $R_2$, $R_3$ and $R_4$ may represent an aralkyl, for example benzyl, or an aryl residue and X represents an anion, in particular chlorine, bromine, iodine or the anion of trichlorozincic, sulfuric, nitric or phosphoric acid, of sulfuric acid semilower-alkyl ester, lower alkane carboxylic acid, lower alkane sulfonic acid, aryl carboxylic or aryl sulfonic acid, wherein lower means containing up to four carbon atoms and aryl means phenyl or phenyl substituted by lower alkyl, lower alkoxy, chlorine or bromine.

Dyestuffs which are specially useful are those of the formula (2) 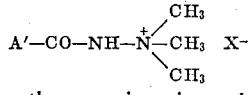

in which X has the meaning given above and A' represents an anthraquinone or azo dyestuff residue free from sulphonic acid and carboxylic acid groups which is bound either directly or through an alkylene, an oxygen or a nitrogen bridging group.

The now dyestuffs may be manufactured in accordance with the invention by quaternation, couping or condensation.

a. When manufacture is carried out by quaternation, the corresponding dyestuffs, which contain a non-quaternated hydrazide radical, are treated with quaternating agents, for example, dyestuffs of the formula (3) 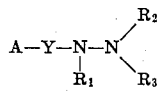

in which A, Y, $R_1$, $R_2$ and $R_3$ have the meanings given above, are reacted with compounds of the formula $R_4X$, in which X has the meaning given above and $R_4$ represents an alkyl, aralkyl or a cycloalkyl residue.

For example, a non-quaternated hydrazido compound of the formula (4) 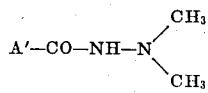

may be quaternated with a compound of the formula $R_4X$, for example, with dimethyl sulphate, methyl chloride, methyl iodide, or a toluene-sulphonic acid methylester.

Compounds of the formula (4) may be advantageously manufactured, for example, by reacting a dyestuff carboxylic acid ester with N,N-dimethylhydrazine. In the manufacture of azo dyestuffs of the formula (4) it is also possible to treat a diazo and/or coupling component with a hydrazide and then combine the components by diazotization and coupling.

When manufacture is to be carried out by quaternation of hydrazides which do not contain a tertiary nitrogen atom, the hydrogen atom or atoms bound to the external nitrogen atom must be replaced, either prior to or simultaneously with quaternation in accordance with the invention by reaction with a compound which donates alkyl residues; advantageously, this is effected in a single operation simultaneously with quaternation and with the use of the same alkyl-donating compound.

The following are examples of suitable alkylating or quaternating agents: esters of strong mineral acids or organic sulphonic acids, for example, dimethyl sulphate, diethyl sulphate, alkyl halides, for example, methyl chloride, methyl bromide or methyl iodide, aralkyl halides, for example, benzyl chloride, esters of low-molecular-weight alkano sulphonic acids, for example, methyl esters of methano-sulphonic acid, othane-sulphonic acid or butano-sulphonic acid, and esters of benzene-sulphonic acids, which may contain additional substituents, for example, methyl, ethyl, propyl or butyl esters of benzene-sulphonic acid, of 2- or 4-methylbenzene-sulphonic acid, 4-chlorobenzene-sulphonic acid or 3- or 4-nitrobenzene-sulphonic acid.

Alkylation is advantageously effected by heating in an inert organic solvent, for example, in an hydrocarbon, for example, benzene, toluene or xylene, in a halogenated hydrocarbon, for example, carbon tetrachloride, tetrachloroethane, chlorobenzene or ortho-dichlorobenzene, or in a nitrohydrocarbon, for example, nitromethane, nitrobenzene or a nitronaphthalene. It is also possible to use acid anhydrides, acid amides or nitriles, for example, acetic anhydride, dimethylformamide or acetonitrile, and also dimethylsulphoxide as solvents for the alkylation process. Instead of a solvent it is also possible to use a large excess of the alkylating agent. If this procedure be adopted, care must be taken to ensure that the mixture does not become excessively heated, because the reaction is highly oxothermic. However, in most cases it is generally necessary, especially in the presence of organic solvents, to apply external heat to the reaction mixture to initiate the reaction. In special cases, alkylation may also be carried out in an aqueous medium or with the use of an alcohol, if necessary, in the presence of a small amount of potassium iodide.

The acid hydrazides serving as starting materials in the manufacture by quaternation may be obtained by reacting the corresponding acids, or especially the derivatives of such acids, for example, anhydrides or acid chlorides, but preferably acid esters, for example, ethyl esters of dyestuff acids of the formula A—Y—OH or A'—COOH, with hydrazines. Replacement of the ester grouping by the hydrazine is advantageously effected at an elevated temperature and under superatmospheric pressure, if necessary, in the presence of an organic or aqueous solvent. The reaction may also be carried out under milder conditions if a suitable catalyst be used.

Dyestuff radicals represented by A or A' that may be mentioned are those belonging to the nitroso, nitro, styryl, stilbene, diarylmethane, triarylmethane, methine, polymethine, sulphur, anthraquinone, quinoneimine, azine, oxazine, thiazine, perinono, napthoquinone, indigo, quinophthalone, pyrazolone, xanthene, acridine, quinoline, cyanine, phthalocyanine, azomethine series or especially to the mono-, dis- or poly-azo dyestuff series. Suitable anthraquinone dyestuff radicals are, for example, those of the formula

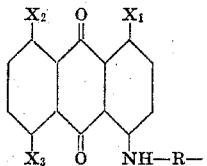

in which R represents a low-molecular alkyl or an aryl residue, for example, a methylene or a phenylene residue, $X_1$ represents an —$NH_2$ group or an —OH group and $X_2$ and $X_3$ each represents a hydrogen atom or an —$NH_2$, an —OH or an —$NO_2$ group, or those anthraquinones which contain further substituents, for example, halogen atoms or alkyl or alkoxy groups, in ortho-position to one of the two groups $X_1$ or —NH—R—.

Special mention may be made of the following starting materials belonging to the series of anthraguinono dyestuff acids whose derivatives may be reacted to form hydrazides and subsequently quaternated in accordance with method a), the symbol Z in the following formulae representing —Y—OH or especially —COOH, as indicated above:

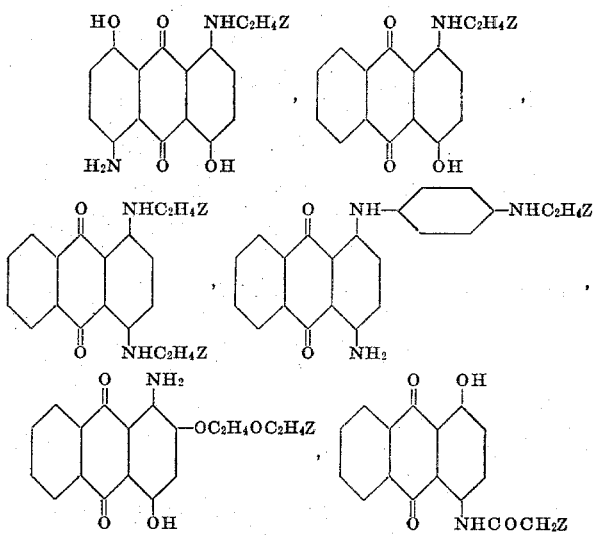

and

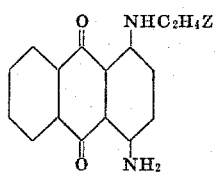

Starting materials belonging to the nitro dyestuff series, in which Z has the meaning mentioned above, that may be mentioned are as follows:

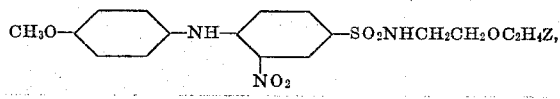

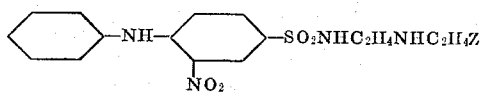

and

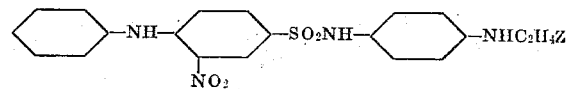

Examples of styryl dyestuffs that may be mentioned, in which Z also has the same meaning, are as follows:

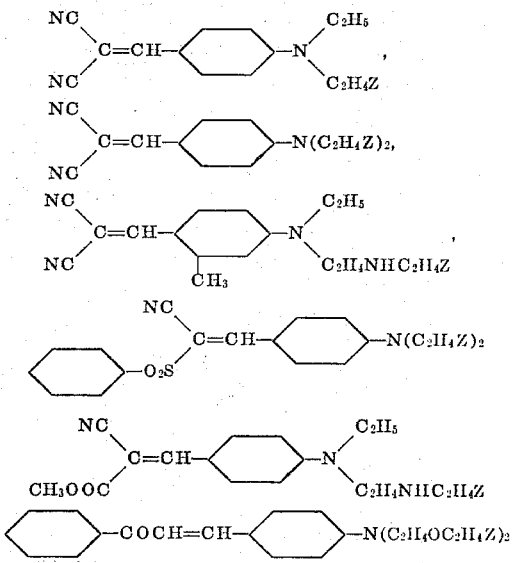

Suitable azo dyestuffs are those obtained by coupling diazotized amines, preferably amines of the aromatic or heterocyclic series, with any desired coupling components. Preferably they contain no other substituents than lower alkyl, trifluoromethyl, lower alkoxy, chlorine, bromine, cyano, nitro, phenylazo, lower alkoxycarbonyl, lower alkanecarbonyl, lower alkanesulfonyl, acylamino and sulfonic acid amide, which may be unsubstituted or substituted by lower alkyl, aryl lower alkyl or aryl. Examples of aryl groups are phenyl, toluyl, bromophenyl and chlorophenyl. The term "acylamino" encompasses lower alkanoylamino, aroylamino, lower alkylsulfonylamino, arylsulfonylamino, lower alkoxycarbonylamino, ureido and lower alkylureido. A list of diazo and coupling components that may be used is given below in the section dealing with manufacture by coupling.

Hydrazines that are suitable for use in the manufacture of the starting materials are principally those in which one of the two nitrogen atoms of the hydrazine grouping is present as a tertiary nitrogen atom bound to two carbon atoms, or the water-soluble salts thereof; the other nitrogen atom, however, is a primary atom or, at most, a secondary atom. In addition to one or more hydrazine groups, the hydrazines used may also contain substituents, for example, halogen atoms or nitro, alkoxy or hydroxyl groups. However, the preferred hydrazines are those containing only carbon and hydrogen atoms in addition to at least one group of the formula

for example, hydrazines containing at least one tertiary nitrogen atom which are substituted solely by non-aromatic hydrocarbon residues. Such hydrazines may correspond, for example, to the formula

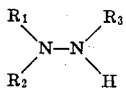

in which $R_1$ and $R_2$ each represents an aliphatic hydrocarbon residue containing not more than 4 carbon atoms and $R_3$ also represents a residue of the kind defined, a group of the formula

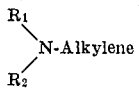

or preferably a hydrogen atom. The purely aliphatic hydrazines preferably correspond to the formula

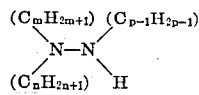

in which $m$ and $n$ each represents an integer not greater than 4, preferably 1, and $p$ represents an integer not greater than 5, preferably 1. The aliphatic hydrocarbon residues in these hydrazine compounds may be branched, but they are preferably straight-chain residues.

It is also possible to use two or more hydrazines at the same time.

The water-soluble salts of the hydrazines, which, if desired, may be reacted instead of the free bases, are derived, for example, from the common inorganic or organic acids, for example, sulphuric, hydrochloric, phosphoric, acetic, formic, propionic, chloroacetic, oxalic or tartaric acid.

b. As has already been mentioned, the new dyestuffs may also be manufactured by coupling. In the coupling process, which is used in the case of azo dyestuffs, a diazo compound is coupled with a coupling component, of which at least one contains a quaternated hydrazine residue as described above, preferably the residue of the formula (5)

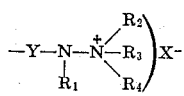

in which $R_1$, $R_2$, $R_3$, $R_4$, Y and X have the meanings given above.

As examples of diazo compounds, there may be mentioned, in particular, aromatic compounds, for example, those belonging to the naphthalene series and especially to the benzene series and containing as substituents lower alkyl, trifluoromethyl, lower alkoxy, chlorine, bromine, cyano, nitro, phenylazo, lower alkoxycarbonyl, lower alkanecarbonyl, lower alkanesulfonyl, acylamino and sulfonic acid amide.

These correspond, for example, to the formula

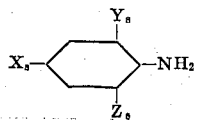

in which $X_S$ represents hydrogen, chlorine, bromine, cyano, lower alkoxy-carbonyl, lower alkanecarbonyl, lower alkanesulfonyl, sulfonamide, phenylazo or nitro, $Y_S$ represents hydrogen, chlorine, bromine, nitro, lower alkyl, lower alkoxy, trifluoromethyl, lower alkoxycarbonyl, lower alkanecarbonyl or cyano and $Z_S$ represents hydrogen, chlorine or bromine, and in which at least one of the residue $X_S$ and $Y_S$ represents chlorine, bromine, nitro, lower alkanecarbonyl, lower alkoxycarbonyl, cyano, lower alkanesulfonyl or sulfonamide.

Examples of diazo components of the benzene series that may be used are as follows:- aniline, 1-amino-3- or -4-chlorobenzene, 1-amino-4-bromobenzene, 1-amino-2-, -3- or -4-methylbenzene, 1-amino-2-, -3- or -4-nitrobenzene, 1-amino-4-cyanobenzene, 1-aminobenzene-3- or -4-methylsulphone, 1-amino-2-chlorobenzene-4-methylsulphone, 1-amino-2,5-dicyanobenzene, 1-amino-4-carbethoxybenzene, 1-amino-2,4- or 2,5-dichlorobenzene, 1-amino-2,4-dibromobenzene, 1-amino-2-methyl-4- or -6-chlorobenzene, 1-amino-2-trifluoromethyl-4-chlorobenzene, 1-amino-2-cyano-4-chlorobenzene, 1-amino-2-cyano-4-nitrobenzene, 1-amino-2-carbomethoxy-4-chlorobenzene, 1-amino-2-methanesulphonyl-4-chlorobenzene, 1-amino-2-carbomethoxy-4-nitrobenzene, 1-amino-2-phenoxy-4-nitrobenzene, 1-amino-2-chloro-4-cyanobenzene, 1-amino-2-chloro-4-nitrobenzene, 1-amino-2-methoxy-4-nitrobenzene, 1-amino-2-chloro-4-carbethoxybenzene, 1-amino-2,4-dinitrobenzene, 1-amino-2,4-dicyanobenzene, 1-amino-2,6-dichloro-4-cyanobenzene, 1-amino-2,6-dichloro-4-nitrobenzene, 1-amino-2,5- or -2,6-dichlorobenzene-4-sulphonic acid dimethyl amide, 1-amino-2-chlorobenzene-4-sulphonic acid dimethylamide, 1-amino-2,6-dibromobenzene-4-sulphonic acid amide, 1-amino-2,4-dinitro-6-chloroor -6-bromobenzene, 1-amino-2,4-dicyano-6-chlorobenzene, 1-amino-2,4,6-trichloro- or -tribromobenzene, 1-aminobenzene-3- or -4-sulphonic acid amide, 1-aminobenzene-3- or -4-sulphonic acid-N-methyl- or diethyl amide, 4-aminoazobenzene, 4-amino-2'-chloroazobenzene, 4-amino-2',4'-dichloroazobenzene, 4-amino-3'-chloroazobenzene, 4-amino-2'-nitroazobenzene, 1-amino-4-nitrobenzene-2-methylsulphone, 1-aminobenzene-4-carboxylic acid-β-methoxyethyl ester, 4-amino-3-nitroazobenzene, 4-amino-3'-nitroazobenzene, 4-amino-2-methylazobenzene, 4-amino-4'-methoxyazobenzene, 4-amino-3-nitro-2'-chloroazobenzene, 4-amino-3-nitro-4'-chloroazobenzene, 4-amino-3-nitro-2', 4'-dichloroazobenzene, 4-amino-3-nitro-4'-methoxyazobenzene, 4-aminodiphenyl and 2- or 4-aminodiphenyl ether.

The diazo component may also be any desired diazotizable heterocyclic amine which is free from acidic substituents imparting solubility in water, but especially an amine having a heterocyclic five-membered ring containing 2 or 3 hetero atoms, especially a nitrogen atom and one or two sulphur, oxygen or nitrogen atoms.

Examples of heterocyclic diazo components that may be mentioned are as follows:- 2-aminothiazole, 2-amino-5-nitrothiazole, 2-amino-5-methylsulphonylthiazole, 2-amino-5-cyanothiazole, 2-amino-4-methyl-5-nitrothiazole, 2-amino-4-methylthiazole, 2-amino-4-phenylthiazole, 2-amino-4-(4'-chloro)-phenylthiazole, 2-amino-4-(4'-nitro)-phenylthiazole, 3-aminopyridine, 3-aminoquinoline, 3-aminopyrazole, 3-amino-1-phenylpyrazole, 3-aminoindazole, 3-amino-1,2,4-triazole, 3-amino-1-(4'-methoxyphenyl)-pyrazole, 2-aminobenzthiazole, 2-amino-6-methylbenzthiazole, 2-amino-6-methoxybenzthiazole, 2-amino-6-chlorobenzthiazole, 2-amino-6-cyanobenzthiazole, 2-amino-6-nitrobenzthiazole, 2-amino-6-carboethoxybenzthiazole, 2-amino-6-methylsulphonylbenzthiazole, 2-amino-1,3,4-thiadiazole, 2-amino-1,3,5-thiadiazole, 2-amino-4-phenyl- or -4-methyl-1,3,5-thiadiazole and 2-amino-5-phenyl-1,3,4-thiadiazole.

When using the above-mentioned diazo components, the hydrazide group must be present in the coupling component, provided it is not introduced subsequently by condensation. The coupling component may be phenyl or phenyl substituted by chlorine, bromine, lower alkyl, trifluoromethyl, lower alkoxy or acylamino, which phenyl radical further contains a residue of the formula $$-CH_2-CH_2-Q^+ \ X$$

bound in p-position to the azo group through a nitrogen atom, in which formula $Q^+$ represents

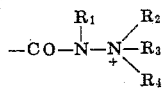

wherein $R_1$ is lower alkyl or hydrogen and $R_2$, $R_3$ and $R_4$ each represents lower alkyl and X and lower have the meanings given above. The term acylamino encompasses lower alkanoylamino, aroylamino, lower alkylsulfonylamino, arylsulfonylamino, lower alkoxycarbonylamino, ureido and lower alkyl ureido groups, wherein aryl denotes in particular residues of the benzene series for example phenyl, chlorophenyl, bromophenyl, lower alkoxy- and lower alkylphenyl.

As such coupling components there may be mentioned, for example, the quaternated hydrazides of anthranilic acid, N,β-carboxyethylaniline, N-ethyl-N-β-carboxyethylaniline, N,β-hydroxy- or -acetoxyethyl-N-β-carboxyethylaniline, N-methyl- or N-ethyl-N-β-carboxyethyl-meta-chloroaniline, N-methyl- or N-ethyl-N-β-carboxyethylaniline, N-ethyl-N-β-carboxyethyl-metatoluidine, N-β-methoxyethyl-N-β-carboxyethyl-meta-toluidine, N-β-carboxyethyl-orthoanisidine, N-β-carboxyethyl-N-methylanisidine, N-β-carboxyethyl-N-β-cyanoethylanisidine, N-benzyl-N-β-carboxyethylaniline, N-β-cyanoethyl-N-β-carboxyethylaniline, N-acetomethyl-N-β-carboxyethyl-metachloro- or methylaniline, N-β-cyanoethoxyethyl-N-β-carboxyethyl-meta-toluidine, N-ethyl-N-carboxyethyl-meta-acetylaminoaniline, N-β-acetoxy- or -cyanoethyl-N-carboxyethyl-meta-acetylaminoaniline, N-β-carbethoxy- or -cyanoethyl-N-carboxyethyl-metachloroaniline, N-β-aminocarbonylethyl-N-β-carboxyethylaniline, N-β-dimethylaminocarbonylethyl-N-β-carboxyethylaniline, N-β-phenthioethyl-N-β-carboxyethylaniline and the corresponding N-carboxymethylanilines and, also, for example, compounds of the following formulae, in which the symbol Q represents a quaternated hydrazide group bound through a —CO— bridging group:-

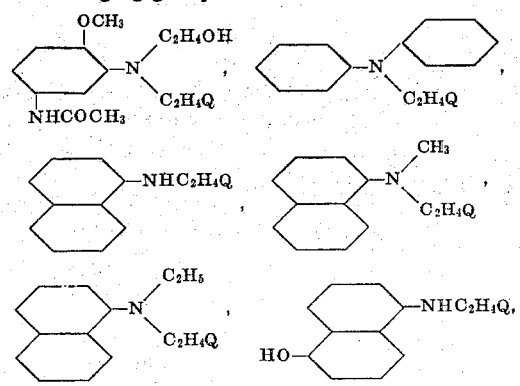

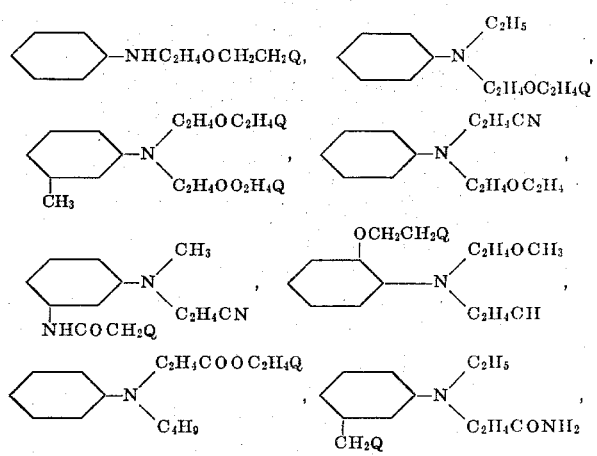

and also, for example, 2-aminonaphthalene-3-carboxylic acid-N,N,N'-trimethylhydrazide, 2-aminonaphthalene-carboxylic acid-N,N,N'-triethylhydrazide and 1-phenyl-5-pyrazolone-3-carboxylic acid-N,N,N'-trimethylhydrazide.

When using coupling components which do not contain a quaternated hydrazide group, the group must be present in the diazo component, provided it is not introduced subsequently by condensation. Diazo components of the kind defined are, in particular, aminobenzenes of the formula

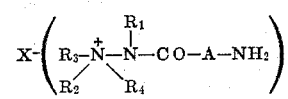

in which X, $R_1$, $R_2$, $R_3$ and $R_4$ have the meanings ascribed to them in formula (1) and A represents a benzene nucleus which may carry substituents, for example, halogen atoms or nitro or low alkyl or alkoxy groups.

Examples that may be mentioned are the quaternated derivatives of the following aminobenzoic acid hydrazides:-4-aminobenzoic acid-N,N-dimethylhydrazide, 4-aminobenzoic acid-N,N,N'-triethylhydrazide, 4-aminobenzoic acid-N-piperidine amide, 4-aminobenzoic acid-N,N,N'-trimethylhydrazide, 4-aminobenzoic acid-3-methoxy-N,N,N'-trimethylhydrazide, 4-aminobenzoic acid-3-chloro-N,N,N'-trimethylhydrazide, 4-aminobenzoic acid-3-bromo-N,N,N'-trimethylhydrazide, 4-aminobenzoic acid-2-chloro-N,N,N'-trimethylhydrazide, 4-aminobenzoic acid-2,5-dimethyl-N,N,N'-trimethylhydrazide, 3-aminobenzoic acid-N,N,N'-trimethylhydrazide and 4-aminobenzoic acid-N-ethyl-N-benzyl-N'-methylhydrazide.

Also suitable as diazo components containing a quaternated hydrazide group are those of the general formula

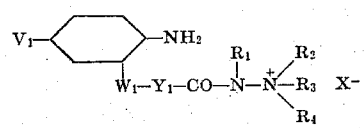

in which $V_1$ represents a nitro, an alkylsulphonyl or sulphonamide group, which may be substituted, $W_1$ represents a divalent residue, for example, an —O— or —S— bridging component or a direct bond, $Y_1$ represents an alkylene bridge or a direct bond and $R_1$, $R_2$, $R_3$, $R_4$ and X have the meanings ascribed to them in formula (1), and in which the benzene residue may contain further substituents. Diazo components of the kind defined which maybe mentioned are, for example, the compounds of the formulae

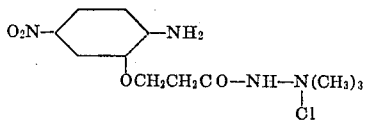

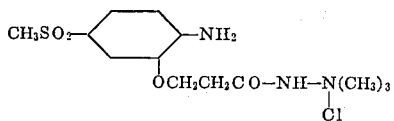

Other suitable diazo components which contain a quaternated hydrazide group are those of the general formula

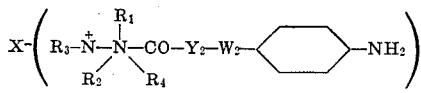

in which $W_2$ represents a divalent organic residue, for example, a bridging group of the formula —SO—, —$SO_2NR_5$—, —$CONR_5$— or —COO—, $Y_2$ represents a alkylene bridging group, $R_1$, $R_2$, $R_3$, $R_4$ and X have the meanings ascribed to them in formula (1) and $R_5$ represents a hydrogen atom or an alkyl, cycloalkyl, aralkyl or aryl group. Such diazo components are, for example,

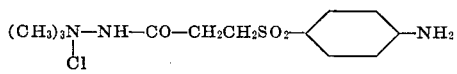

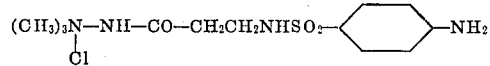

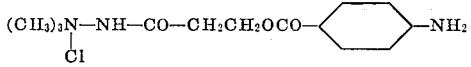

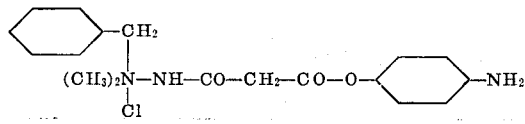

As diazo components of the benzene series there may also be mentioned the compounds of the formulae

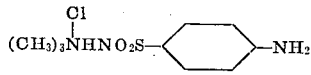

or

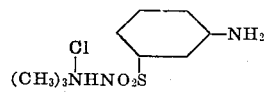

Suitable diazo components of the naphthanlene series which contain a quaternated hydrazide group are, for example, quaternated hydrazides of 2-aminonaphthalene-3-carboxylic acid.

Any desired coupling component may then be used for the coupling, for example, those belonging to the benzene or naphthalene series or those belonging to the series of heterocyclic coupling components. Apart from the phenols, for example, para-cresol, the coupling components of the benzene series that may be mentioned in particular are the aminobenzenes.

The coupling component may be further defined as the radical of 1-phenyl-3-methyl-5-hydroxypyrazole bound to the azo group in 4-position, phenyl or phenyl substituted by chlorine, bromine, lower alkyl, trifluoromethyl, lower alkoxy or acylamino, which phenyl radical contains in para-position to the azo-group an amino group mono- or di-N-substituted by lower alkyl, aryl, cyano lower alkyl, lower alkoxy-lower alkyl, cyano lower alkoxy lower alkyl, aryl-lower alkyl, acyloxy-lower alkyl, lower alkoxy-carbonyl-lower alkyl or by the group $$— CH_2CH_2—Q^+_1 \ X^-,$$

wherein "sulfonic acid amide" means an unsubstituted sulfonic acid amide group or sulfonic acid amide substituted by lower alkyl, aryl-lower alkyl or aryl and $Q_1$, $X_1$ lower, aryl and acylamino have the meanings given above and acyloxy means lower alkanoyloxy, aroyloxy, such as benzoyloxy lower alkylsulphonyloxy and aryl sulphonyloxy, for example benzenesulphonyloxy. Examples of coupling components of the aminobenzene series are: aniline, 3-methylaniline, 2-methoxy-5-methylaniline, 3-acetylamino-1-aminobenzene, N-methylaniline, N-$\beta$-hydroxyethylaniline, N,$\beta$-methoxyethylaniline, N-$\beta$-cyanoethylaniline, N-$\beta$-chloroethylaniline, diethylaniline, dimethylaniline, N-methyl-N-benzylaniline, N-n-butyl-N-$\beta$-chloroethylaniline, N-methyl-N-$\beta$-cyanoethylaniline, N-methyl-N-$\beta$-hydroxyethylaniline, N-ethyl-N-$\beta$-chloroethylaniline, N-methyl-N-$\beta$-acetoxyethylaniline, N-ethyl-N-$\beta$-methoxyethyl-aniline, N-$\beta$-cyanoethyl-N-$\beta$-chloroethylaniline, N-cyanoethyl-N-acetoxyethylaniline, N,N-di-$\alpha$-hydroxyethylaniline, N,N-di-$\beta$-acetoxyethylaniline, N-ethyl-N,2-hydroxy-3-chloropropylaniline, N,N-de-$\beta$-cyanoethylaniline, N,N-di-$\beta$-cyanoethyl-3-methylaniline, N-$\beta'$-cyanoethyl-N-$\beta''$-hydroxyethyl-3-chloroaniline, N,N-di-$\beta$-cyanoethyl-3-methoxyaniline, N,N-dimethyl-3-acetylaminoaniline, N-ethyl-N-$\beta$-cyanoethyl-3-acetylaminoaniline, N,N-di-$\beta$-cyanoethyl-2-methoxy-5-acetylaminoaniline, N-methyl-N-phenacylanilines, N-$\beta$-cyanoethyl-2-chloroaniline, N,N-diethyl-3-trifluoromethylaniline, N-ethyl-N-phenylaniline, diphenylamine, N-methyldiphenylamine, N-methyl-4-ethoxydiphenylamine or N-phenylmorpholine, and also, for example, amines of the formula

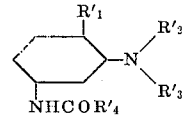

in which $R_1'$ represents a hydrogen atom or an alkyl or alkoxy group, $R_2'$ represents a cyanoalkoxyalkyl group, $R_3'$ represents a hydrogen atom or a cyanoalkoxyalkyl or acyloxyalkyl group and $R_4'$ represents a hydrogen atom or an alkyl, cycloalkyl or alkoxy group that may be substituted or a benzene residue, and especially those of the formula

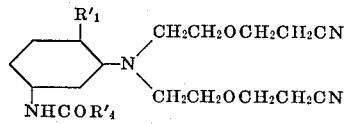

in which $R_1'$ and $R_4'$ have the meanings given above.

Specially valuable results may also be obtained with coupling components of the formula

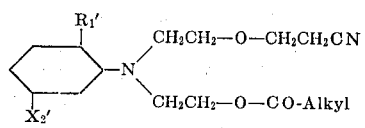

and

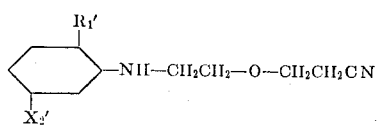

in which $R_1'$ has the meaning given above and $X_2$ represents an acylamino group, and in which alkyl represents, for example, a methyl, ethyl or propyl group.

The following coupling components are mentioned as examples:-

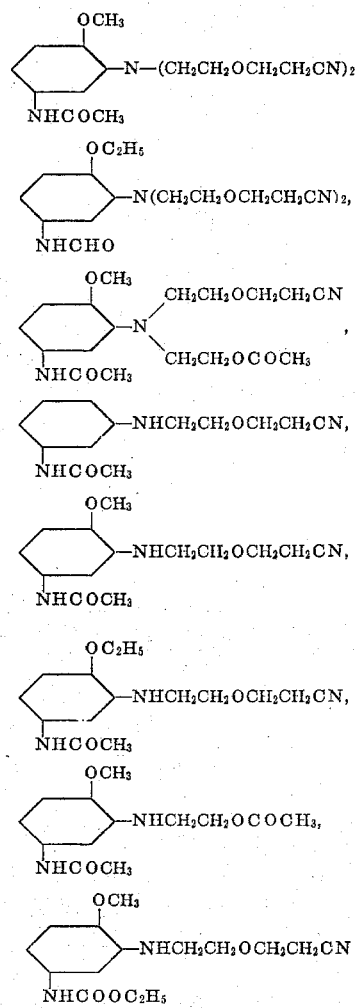

and

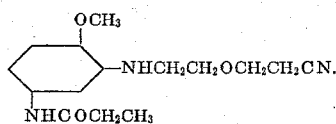

Coupling components belonging to the naphthalene series that may be mentioned apart from the naphthols are, for example, 1- or 2-naphthylamine, 2-phenylaminonaphthalene, 1-dimethylaminonaphthalene and 2-ethylaminonaphthalene and also 2-aminonaphthalene-3-carboxylic acid amide, 2-aminonaphthalene-3-carboxylic acid anilide, 2-aminonaphthalene-3-carboxylic acid-N-methylanilide, 2-aminonaphthalene-3-carboxylic acid benzyl amide, 2-aminonaphthalene-3-carboxylic acid methyl ester, 2-aminonaphthalene-3-carboxylic acid butyl ester, 2-aminonaphthalene-3-carboxylic acid-β-hydroxyethyl ester and 2-aminonaphthalene-3-carboxylic acid phenyl ester. Coupling components belonging to the heterocyclic series that may be mentioned are, for example, the indoles, for example, 2-methylindole, 2,5-dimethylindole, 2,4-dimethyl-7-methoxyindole, 2-phenyl- or 2-methyl-5-ethoxyindole, 2-methyl-5- or -6-chloroindole, 1,2-dimethylindole, 1-methyl-2-phenylindole, 2-methyl-5-nitroindole, 2-methyl-5-cyanoindole, 2-methyl-7-chloroindole, 2-methyl-5-fluoro- or -5-bromoindole, 2-methyl-5,7-dichloroindole or 2-phenylindole, 1-cyanoethyl-2,6-dimethylindole, and also pyrazoles, for example, 1-phenyl- 5-aminopyrazole or 3-methylpyrazolone-5 or 1-phenyl-3-methylpyrazolone- 5, 1,3-dimethylpyrazolone-5, 1-butyl-3-methylpyrazolone-5, 1-hydroxyethyl-3-methylpyrazolone-5, 1-cyanoethyl-3-methylpyrazolone-5, 1-(ortho-chlorophenyl)-3-methylpyrazolone-5, 3-carbomethoxypyrazolone-5, quinolines, for example, 1-methyl-4-hydroxyquinolone-2 or N-ethyl-3-hydroxy-7-methyl-1,2,3,4-tetrahydroquinoline, or pyrimidines, for example, barbituric acid, and also 1,3-indandione, 1,8-naphthinedandione or dimedone.

Instead of a single diazo component, it is also possible to use a mixture of two or more of the diazo components of the invention, and, instead of a single coupling component, it is also possible to use a mixture of two or more coupling components of the invention.

Diazotization of the above-mentioned diazo components may be carried out in known manner, for example, with a mineral acid especially hydrochloric acid, and sodium nitrite or, for example, with a solution of nitrosyl sulphuric acid in concentrated sulphuric acid.

Coupling may also be carried out in known manner, for example, in a neutral to acid medium, if necessary, in the presence of sodium acetate or a similar buffer which influences the rate of coupling, or a catalyst, for example, pyridine, or a salt thereof.

Manufacture of the diazo or coupling components containing a hydrazide group of the kind defined which are used as starting products may be carried out by reacting the corresponding coupling or diazo components containing an acid group or a derivative thereof, especially an acid ester group, with hydrazines in a manner analogous to that described above for the manufacture of dyestuff acid hydrazides, and subsequent quaternation.

c. Finally, the new dyestuffs may also be manufactured by condensation. In manufacture by condensation, a compound of the formula

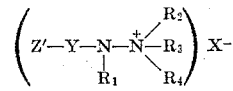

in which $R_1$, $R_2$, $R_3$, and X and Y have the meanings given above and Z' represents a reactive atom or a reactive group bound through a bridging component, for example, through an alkyl group, for example, a halogen atom or a sulphate, amino, carboxylic acid chloride or a sulphonic acid chloride group and the like, is reacted with a compound of the formula A'–Z'', in which A' represents a dyestuff radical and Z'' represents a reactive atom or a reactive group capable of reacting with Z'. For example, a dyestuff carboxylic acid or sulphonic acid chloride may be reacted with a compound containing a quaternated acid hydrazide group and an acylatable amino group, for example, with quaternated y-aminopropionic acid-N,N-dimethylhydrazide, or dyestuffs which contain an amino group may be reacted, for example, with compounds of the formula

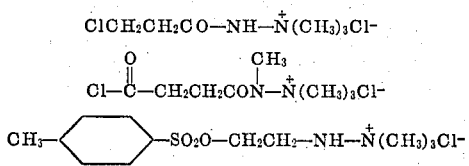

Such reactions are advantageously performed in a neutral solvent, for example, in chlorobenzene, an alcohol or an aqueous alcohol mixture or dimethylformamide or in the absence of a solvent advantageously at an elevated temperature in an excess of the hydrazide compound and, if necessary, in the presence of a catalyst, for example, sodium iodide.

The dyestuff salts may be purified, if necessary, by dissolving them in water and filtering any unreacted starting dyestuff as an insoluble residue. The dyestuff may be precipitated from the aqueous solution by the addition of a water-soluble salt, for example, sodium chloride.

The quaternated dyestuffs obtained by the process of the invention preferably contain as anion the residue of a strong acid, for example, sulphuric acid, or a semi lower-alkyl-ester thereof, for example methylsulphate or ethylsulphate, or the residue of an arylsulphonic acid or a halogen ion. Important arylsulphonic acids are those of the benzene series, that are unsubstituted or substituted by lower alkyl, lower alkoxy, chloro or bromo, such as benzene sulphonic acid, toluenesulphonic acid or bromobenzene sulphonic acid. The said anions, which are introduced into the dyestuff molecule in accordance with the invention, may also be replaced by anions of other inorganic acids, for example, phosphoric, nitric or sulphuric acid, or by the anions of $C_1$–$C_4$ alkane carboxylic or sulphonic acids or aromatic carboxylic acids of the benzene series, for example, formic, lactic, acetic, tartaric acid; benzoic, bromobenzoic, toluic or methanesulphonic acid. In some cases it is also possible to use the free bases. The dyestuff salts may also be in the form of double salts, for example, with halides of elements of Group II of the Periodic Table, especially zinc chloride or cadmium chloride.

The dyestuffs or dyestuff salts obtained by the process of the invention which contain a quaternated hydrazide group are suitable for dyeing and printing a very wide variety of synthetic fibres, for example, basic modified polyamide and polyurethane fibres, and also fibres made from basic modified polyesters of aromatic dicarboxylic acids, for example, polyethylene terephthalate fibres but especially polyacrylonitrile fibres or polyvinylidene cyanide fibres (Darvan). By polyacrylonitrile fibres is meant principally polymers containing more than 80 per cent of acrylonitrile, for example, 80 to 95 per cent; they may also contain 5 to 20 per cent of vinyl acetate, vinylpyridine, vinyl chloride, vinylidene chloride, acrylic acid, an acrylic acid ester, methacrylic acid, a methacrylic acid ester and so forth. These products are sold under the following registered trademarks: "Acrilan 1956" (Chemstrand Corporation, Decatur, Alabama, U.S.A.), "Acrilan 41" (Chemstrand Corporation), "Creslan" (American Cyanamid Company), "Orlon 44" (Du Pont), "Crylor HH" (Soc. Rhodiaceta SA, France), "Leacril N" (Applicazioni Chimice Societa per Azioni, Italy), "Dynel" (Union Carbide Chem. Corp.), "Exlan" (Japan, Exlan Industry Co., Japan), "Vonnel" (Mitsubishi, Japan), "Verel" (Tennessee Eastman, U.S.A.), "Zefran" (Dow Chemical, U.S.A.) "Wolcrylon" (Filmfabrik Agfa, Wolfen), "Ssaniw" (U.S.S.R.) and also "Orlon 42" "Dralon", "Courtelle" and so forth.

The new dyestuffs produce on these fibres intense and level dyeings possessing a good fastness to light and good properties of general fastness, especially a good fastness to washing, perspiration, sublimation, crease-resist finishing, decatizing, hot-pressing, rubbing, carbonizing, water, sea water, dry cleaning, cross-dyeing and solvents. These fibres may also be dyed in admixture with one another. The new dyestuffs of the invention also display, inter alia, good stability in a wide pH range, good affinity in aqueous solutions of different pH values and a good fastness to kier boiling. Furthermore, the new dyestuffs reserve well on wool and other natural polyamide fibres.

The quaternated, water-soluble dyestuffs generally show little sensitivity to electrolytes, and some of them display exceptionally good solubility in water or polar solvents. Dyeing with the quaternated, water-soluble dyestuffs is generally carried out in an aqueous neutral or acid medium at the boil under atmospheric pressure or in a closed vessel at an elevated temperature and under superatmospheric pressure. The ordinary commercially available levelling agents have no deleterious effect when used, but they are not necessary.

The said dyestuffs are also highly suitable for three-colour dyeing. Furthermore, by virtue of their stability to hydrolysis, they may be used with advantage in high-temperature dyeing and for dyeing in the presence of wool. They may also be applied to the fibrous materials by printing processes. In this method of application, a printing paste is used which, in addition to the dyestuff, contains the usual printing adjuvants. The dyestuffs are also suitable for the bulk-colouration of acrylonitrile polymerization products and other plastic products and, if desired, solutions thereof, the colourations produced being fast to light and washing. They are also suitable for colouring oil paints and lacquers, and dyeing cotton, especially mordanted cotton, cellulose, regenerated cellulose and paper.

The dyestuffs may also be applied by printing processes. In this method of application the printing pastes contain, for example, the finely divided dyestuff, if necessary, in admixture with one of the above-mentioned cotton dyestuffs, the adjuvants normally used in printing, for example, wetting and thickening agents, and if necessary, urea and/or an agent capable of binding acid.

The processes described produce strong dyeings and prints possessing excellent properties of fastness, especially a good fastness to light, sublimation, decatizing, washing and chlorinated water. A further advantage offered by the dyestuffs to be used in accordance with the invention is that they reserve well on wool and cotton.

The following Examples illustrate the invention. Unless otherwise stated, the parts and percentages are by weight.

EXAMPLE 1

22.1 Parts of β-N-ethylanilinopropionic acid ethyl ester and 12 parts of N,N-dimethylhydrazine are heated for about 12 hours at 150°C in a sealed tube. The reaction product is distilled at about 0.1 mm Hg until the unreacted starting products and any by-products have evaporated. The distillation residue, which is fairly homogeneous, is used again.

3.45 Parts of 2-chloro-4-nitroaniline are diazotized and then coupled at 0° to 5°C with a solution of 4.7 parts of the β-N-ethylaninlinopropionic acid-N,N-dimethylhydrazide, obtained as described above, in 20 parts of alcohol. The coupling mixture is rendered neutral to Congo paper with sodium acetate solution. After some time, the dyestuff which precipitates is isolated by suction filtration, washed with water and dried.

4.18 Parts of the dried product are dissolved in 25 parts of warm chlorobenzene, and then a solution of 2.8 parts of paratoluenesulphonic acid methyl ester in 15 parts of chlorobenzene is added dropwise at about 95°C. The mixture is stirred for about 3 hours at 95°C and then cooled. The product which precipitates is isolated by filtration, dissolved in hot water,

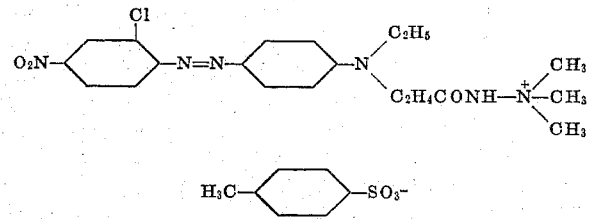

is salted out of the filtrate, isolated by filtration and dried. It dyes polyacrylonitrile fibres strong ruby tints possessing excellent properties of fastness.

EXAMPLE 2

25.2 Parts of chloroformic acid-(2-N-β-cyanoethylanilino)-ethyl ester are added in portions at 10° to 20°C to a solution of 18 parts of N,N-dimethylhydrazine in 30 parts of dry benzene and the mixture is stirred for 24 hours. The suspension is filtered and the filtrate is evaporated in vacuo. The residue is used directly for coupling.

A diazo solution prepared from 17.2 parts of 2-chloro-4-nitroaniline is coupled at 0° to 5°C with a solution of 27.6 parts of the reaction product obtained as described above in 100 parts of alcohol. The coupling mixture is stirred for one hour at 0° to 5°C and the pH is then adjusted to 7 with sodium hydroxide solution. The dyestuff which precipitates is isolated by suction filtration, washed with water and dried.

13.8 Parts of the dried product are dissolved in 70 parts of warm chlorobenzene, and then a solution of 5.7 parts of dimethyl sulphate in 20 parts of chlorobenzene is added dropwise at about 95°C. The mixture is stirred for 3 hours at 95°C and then cooled. The product which precipitates is isolated by filtration, dissolved in hot water, the solution is clarified by filtration, and the dyestuff of the formula

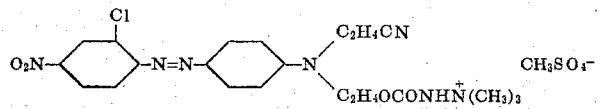

is salted out of the filtrate, isolated by filtration and dried. It dyes polyacrylonitrile fibres strong red tints possessing very good properties of fastness.

EXAMPLE 3

21.3 Parts of 2,3-naphthoisatoic anhydride are reacted with 5.6 parts of N,N-dimethylhydrazine. The purified 2-amino-naphthalene-3-carboxylic acid-N,N-dimethylhydrazide melts at 233°C.

26.2 Parts of 2,4-dinitro-6-bromoaniniline are diazotized in the usual manner and coupled with 22.9 parts of the above compound dissolved in acetic acid. The dyestuff, which precipitates completely, is isolated and recrystallized from dioxane. It melts at 208° to 210°C.

5 Parts of the dyestuff are dissolved at 95°C in 100 parts of chlorobenzene and then 2 parts of dimethyl sulphate in 10 parts of chlorobenzene are added dropwise. The batch is then stirred for 3 hours at 95° to 100°C. The solvent is evaporated in a rotary evaporator and the residue is recrystallized from water with the addition of formic acid and active carbon.

The water-soluble dyestuff of the formula

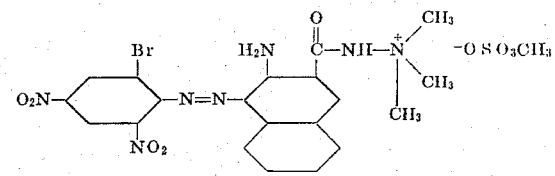

is a dark powder which dyes polyacrylonitrile fibres attractive violet tints possessing very good properties of fastness.

EXAMPLE 4

92.8 Parts of para-nitrobenzoyl chloride are introduced in portions at 0° to 5°C into a solution of 36 parts of N,N-dimethylhydrazine in 350 parts of dry pyridine, and the mixture is stirred for 18 hours at room temperature. The pyridine is distilled in vacuo and the pH of the residue is adjusted to 7 with sodium carbonate solution. The product which precipitates is isolated by suction filtration, washed with water and recrystallized from alcohol. The para-nitrobenzoic acid-N,N-dimethylhydrazide melts at 150° to 151°C. Elementary analysis indicates the following composition:

C 51.4 percent H 5.2 percent N 20.2 percent, as compared with the calculated values for the formula $C_9H_{11}N_3O_3$:

C 51.7 percent H 5.3 percent N 20.1 percent.

62.7 Parts of para-nitrobenzoic acid-N,N-dimethylhydrazide are dissolved in 600 parts of alcohol and then hydrogenated with Raney nickel as catalyst and hydrogen. After hydrogenation, the catalyst is removed by filtration and the solution is evaporated in vacuo.

5.37 Parts of para-aminobenzoic acid-N,N-dimethylhydrazide are dissolved in 18 parts of concentrated hydrochloric acid and 60 parts of water, and then diazotized with 7.5 parts by volume of 4N sodium nitrite solution at 0° to 5°C. The diazo solution is coupled with a solution of 5.22 parts of N-ethyl-N-cyanoethyaniline in alcohol and the batch is stirred for 2 hours. The coupling mixture is rendered neutral to Congo paper with sodium acetate and stirred overnight. The pH of the mixture is then adjusted to 7 with sodium hydroxide solution. The product which precipitates is isolated by filtration, washed with water and dried.

9.1 Parts of the dried product are dissolved in 60 parts of warm nitrobenzene, and then a solution of 4.73 parts of dimethyl sulphate in 20 parts of nitrobenzene is added dropwise at about 95°C. The mixture is stirred for 3 hours at 95°C and then cooled. The product which precipitates is isolated by filtration, dissolved in hot water, the solution is clarified by filtration, and the dyestuff of the formula

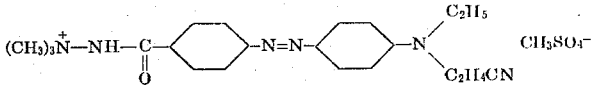

is salted out of the filtrate, isolated by filtration and dried. It dyes polyacrylonitrile fibres brown tints possessing very good properties of fastness.

Table 1 below lists components for the manufacture of further dyestuffs. The dyestuffs are made by diazotizing the diazo component shown in Column I, coupling the diazo compound with the coupling component listed in Column II, and then quaternating with the alkylating agent shown in Column III. The tints produced on polyacrylonitrile fibres with the dyestuffs are indicated in Column IV.

TABLE 1

| | I | II | III | IV |
|---|---|---|---|---|
| 1 | $O_2N-\langle\rangle(CN)-NH_2$ | $\langle\rangle-N(C_2H_5)(C_2H_4CONHN(CH_3)_2)$ | $H_3C-\langle\rangle-SO_3CH_3$ | Red-violet. |
| 2 | $O_2N-\langle\rangle(NO_2)-NH_2$ | Same as above | Same as above | Claret. |
| 3 | $O_2N-\langle\rangle(Cl)(Cl)-NH_2$ | do | do | Brown. |
| 4 | $O_2N-C\langle{}^{HC=N}_{S}\rangle C-NH_2$ | do | $(CH_3)_2SO_4$ | Blue. |
| 5 | $CH_2O_3S-\langle\rangle(Cl)-NH_2$ | $\langle\rangle(CH_3)-N(C_2H_5)(C_2H_5CONHN(CH_3)_2)$ | $C_2H_5Br$ | Scarlet. |
| 6 | $O_2N-\langle\rangle-NH_2$ | Same as above | $C_4H_9Br$ | Do. |
| 7 | $NC-\langle\rangle-NH_2$ | $\langle\rangle(OCH_3)-N(CH_3)(C_2H_4CONHN(CH_3)_2)$ | $\langle\rangle-CH_2Cl$ | Do. |
| 8 | $(CH_3)_2NO_2S-\langle\rangle(Cl)(Cl)-NH_2$ | Same as above | $(CH_3)_2SO_4$ | Do. |
| 9 | $O_2N-\langle\rangle(COOCH_3)-NH_2$ | $\langle\rangle(Cl)-N(C_4H_9)(C_2H_4CONHN(CH_3)_2)$ | $C_2H_5I$ | Red-violet. |
| 10 | $\langle\rangle(Cl)(CF_3)-NH_2$ | $\langle\rangle-N(C_2H_4OCH_3)(C_2H_4CONHN(CH_3)_2)$ | $(CH_3)_2SO_4$ | Orange. |
| 11 | $O_2N-\langle\rangle(NO_2)(Br)-NH_2$ | Same as above | $(CH_3)_2SO_4$ | Violet. |
| 12 | $O_2N-\langle\rangle(OCH_3)-NH_2$ | $\langle\rangle-N(C_2H_4CN)(C_2H_4CONHN(CH_3)_2)$ | $(CH_3)_2SO_4$ | Red. |
| 13 | $\langle\rangle-N=N-\langle\rangle-NH_2$ | $\langle\rangle(OCH_3)-NHC_2H_4CONHN(CH_3)_2$ | $(CH_3)_2SO_4$ | Orange. |
| 14 | $O_2N-\langle\rangle(CN)-NH_2$ | $\langle\rangle-N(C_2H_4CN)(C_2H_4OCONHN(CH_3)_2)$ | $(CH_3)_2SO_4$ | Red. |

TABLE 1—Continued

| I | II | III | IV |
|---|---|---|---|
| 15 | 2,6-dichloro-4-nitroaniline (O$_2$N–C$_6$H$_2$(Cl)$_2$–NH$_2$) | Same as above | $(CH_3)_2SO_4$ | Brown. |
| 16 | 4-nitroaniline (O$_2$N–C$_6$H$_4$–NH$_2$) | C$_6$H$_5$–N(C$_2$H$_5$)(C$_2$H$_4$CONHNH$_2$) | $(CH_3)_2SO_4$ | Scarlet. |
| 17 | 2,2'-dimethyl-4-aminoazobenzene | Same as above | $(CH_3)_2SO_4$ | Red. |
| 18 | 4-nitroaniline | C$_6$H$_4$(NHCOCH$_3$)(NHC$_2$H$_4$CONHNH$_2$) | $(CH_3)_2SO_4$ | Red. |
| 19 | 2-amino-4-nitrobenzonitrile | 2-amino-3-(N,N-dimethylcarbamoyl)naphthalene | $(CH_3)_2SO_4$ | Red-violet. |
| 20 | 2-chloro-4-nitroaniline | Same as above | $(CH_3)_2SO_4$ | Ruby. |
| 21 | 4-chloro-2-nitroaniline | do | $(CH_3)_2SO_4$ | Red. |
| 22 | 2-methylsulfonyl-4-nitroaniline | do | $(CH_3)_2SO_4$ | Red-violet. |
| 23 | 2-nitroaniline | 1-phenyl-3-methyl-5-hydroxy-pyrazole-4-carboxylic acid N,N-dimethylhydrazide | $(CH_3)_2SO_4$ | Yellow. |
| 24 | 2-nitro-4-methylaniline | Same as above | $(CH_3)_2SO_4$ | Do. |
| 25 | 4-amino-(N',N'-dimethyl)benzohydrazide | C$_6$H$_5$–N(CH$_2$C$_6$H$_5$)(C$_2$H$_4$CN), NHCOCH$_3$ | $(CH_3)_2SO_4$ | Scarlet. |
| 26 | Same as above | 1-phenyl-3,5-dimethyl-5-hydroxypyrazole | $(CH_3)_2SO_4$ | Yellow. |
| 27 | do | 1,2-dimethylindole derivative | $(CH_3)_2SO_4$ | Do. |

TABLE 1—Continued

| | I | II | III | IV |
|---|---|---|---|---|
| 28 | ....do.... | H₂N—[naphthyl] | (CH₃)₂SO₄ | Red. |
| 29 | (C₂H₅)₂NHNOC—[phenyl]—NH₂ | [phenyl]—N(C₂H₅)(C₂H₄CN) | (CH₃)₂SO₄ | Brown. |
| 30 | (C₃H₇)₂NHNOC—[phenyl]—NH₂ | Same as above | (CH₃)₂SO₄ | Do. |
| 31 | (H₃C)₂N—N(CH₃)—OC—[phenyl]—NH₂ | ....do.... | (CH₃)₂SO₄ | Do. |
| 32 | CH₃O₂S—[phenyl(Cl)]—NH₂ | [naphthyl(NH₂)]—CONHN(CH₃)₂ | (CH₃)₂SO₄ | Red |
| 33 | CH₃OH₄C₂OOC—[phenyl]—NH₂ | [phenyl(NHSO₂CH₃)]—NHC₂H₄CONHNH₂ | (CH₃)₂SO₄ | Scarlet. |
| 34 | [phenyl]—N=N—[phenyl(OCH₃)(CH₃)]—NH₂ | [phenyl(OCH₃)]—N(CH₂[phenyl])(C₂H₄CONHN(C₂H₅)₂) | [phenyl]—SO₃CH₃ | Red. |
| 35 | O₂N—[phenyl(C₄H₉)]—NH₂ | [phenyl(Cl)]—N(C₂H₄OC₂H₅)(C₂H₄CONHN(C₂H₅)₂) | (C₂H₅)₂SO₄ | Scarlet. |
| 36 | O₂N—[phenyl(Cl)(NO₂)]—NH₂ | [phenyl(OCH₃)(NHCOCH₃)]—NHC₂H₄CONHNH₂ | (CH₃)₂SO₄ | Blue. |
| 37 | C₄H₉CO—[phenyl]—NH₂ | [phenyl]—N(C₂H₄[phenyl])(C₂H₄CONHN(CH₃)₂) | CH₃I | Orange. |
| 38 | Cl—[phenyl]—N=N—[phenyl(CH₃)]—NH₂ | [phenyl(C₄H₉)]—N(CH₃)(C₄H₈CONHN(C₃H₇)₂) | C₂H₅Br | Red. |
| 39 | CH₃OOC—[phenyl(Br)(Br)]—NH₂ | [phenyl(NHSO₂C₄H₉)]—N(CH₃)(C₂H₄CONHNH₂) | (CH₃)₂SO₄ | Red. |
| 40 | O₂N—[phenyl(Br)(Cl)]—NH₂ | [phenyl(OC₄H₉)(NHCOH)]—NCH₃C₆H₆CONHNH₂ | (CH₃)₂SO₄ | Violet. |
| 41 | H₉C₄O₂S—[phenyl]—NH₂ | [phenyl]—N(CH₃)(C₄H₈CONHN(C₄H₉)₂) | CH₃I | Orange. |
| 42 | H₅C₂OOC—[phenyl]—NH₂ | [phenyl(NHCOC₃H₇)]—N(C₂H₅)(C₂H₄CONHNH₂) | (C₂H₅)₂SO₄ | Scarlet. |

TABLE 1—Continued

| I | II | III | IV |
|---|---|---|---|
| 43 | O₂N—[ring]—NH₂, CH₃ | [ring]—N(C₂H₄OC₂H₄CN)(C₂H₄CONHN(CH₃)₂), Br | (C₂H₅)₂SO₄ | Scarlet. |
| 44 | O₂N—[ring]—NH₂, Cl | [ring]—NHC₂H₄CONHNH₂ | (CH₃)₂SO₄ | Violet. |
| 45 | CH₃CO—[ring]—NH₂, Cl, Cl | [ring]—N(C₂H₅)(C₂H₄OC₂H₄CONHN(CH₃)₂) | (CH₃)₂SO₄ | Orange. |
| 46 | O₂N—[ring]—NH₂, CN | [ring]—N(C₂H₅)₂, CH₂CONHNH₂ | (CH₃)₂SO₄ | Claret. |
| 47 | [naphthyridine]—NH₂ | [ring]—N(CH₃)₂, NHCONHNH₂ | (CH₃)₂SO₄ | Scarlet. |
| 48 | H₅C₂HNO₂S—[benzothiazole]—C—NH₂ | [ring]—N(C₂H₄OCH₃)(C₂H₄CONHN(CH₃)₂), CF₃ | (CH₃)₂SO₄ | Red. |
| 49 | [phenyl]—C=N, N—C—NH₂, S (thiadiazole) | [ring]—N(C₃H₇)(C₂H₄CONHN(C₂H₅)₂), OCH₃, CH₃ | C₂H₅I | Ruby. |
| 50 | [phenyl]—C, N—N, C—NH₂, S | [ring]—N(C₂H₄OC₂H₄CN)(C₂H₄CONHN(CH₃)₂) | C₂H₅I | Red. |
| 51 | (CH₃)₂NHNOC—[ring]—NH₂, Br, Br | HC——C—CH₃, H₂N—C  N, N—[ring] | (CH₃)₂SO₄ | Yellow. |

EXAMPLE 5

23.5 Parts of β-N-ethylanilinopropionic acid-N,N-dimethylhydrazide are dissolved in 30 parts of warm chlorobenzene, and then 14 parts of dimethyl sulphate in 20 parts of chlorobenzene are added dropwise at about 90°C. The mixture is stirred for about 3 hours at 95°C and then cooled. The product which precipitates is isolated, washed with petroleum ether and dried.

4.9 Parts of 2-amino-6-nitrobenzthiazole are diazotized and the diazo compound is coupled at 0° to 5°C with a solution of 9 parts of the β-N-ethylanilinopropionic acid-N,N,N-trimethylhydrazide-methosulphate obtained as described above in 50 parts of alcohol. The coupling mixture is stirred for 2 hours and the product is salted out with ammonium sulphate. The product which precipitates is isolated by filtration, dissolved in hot water, the solution is clarified by filtration and the dyestuff of the formula

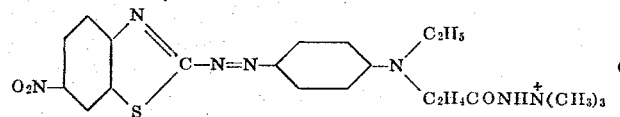

is salted out, isolated by filtration and dried. It dyes polyacrylonitrile fibres violet tints possessing excellent properties of fastness.

EXAMPLE 6

22.1 Parts of β-N-ethylanilinopropionic acid ethyl ester and 8 parts of hydrazine hydrate are stirred for 8 hours at 100°C. The mixture is cooled and diluted with chloroform. The solution is chloroform is washed with 10 percent sodium chloride solution and then evaporated.

20.7 Parts of the β-N-ethylanilinopropionic acid hydrazide obtained in the manner described above are dispersed in 50 parts of water and then 30 parts of sodium bicarbonate are added. 32 Parts by volume of dimethyl sulphate are added dropwise at 10° to 15°C and the batch is stirred for 2 hours. The mixture is then heated to 50° to 60°C and stirred for a further 3 hours. The solution is ready for further use.

17.7 Parts of 5-amino-3-phenyl-1,2,4-thiadiazole are diazotized and coupled at 0° to 5°C with the solution of β-N-ethylanilinopropionic acid-N,N,N-trimethylhydrazide-methosulphate obtained as described above. The coupling mixture is stirred for 5 hours at 0° to 5°C and the product is salted out with ammonium sulphate. The product which precipitate is isolated by filtration, dissolved in hot water, the solution is clarified by filtration and the dyestuff of the formula

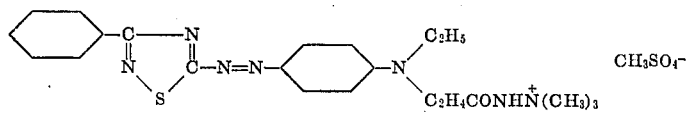

is salted out, isolated by filtration and dried. It dyes polyacrylonitrile fibres red tints possessing excellent properties of fastness.

Table 2 below lists components for the manufacture of further dyestuffs. The dyestuffs are obtained by diazotizing the diazo component shown in Column I and coupling the diazo compound so obtained with the coupling component listed in Column II. The tints obtained with the dyestuffs on polyacrylonitrile fibres are listed in Column III.

TABLE 2

| | I | II | III |
|---|---|---|---|
| 1 | NC—[ring]—S—C—NH₂ (benzothiazole) | [cyclohexyl]—N(C₂H₅)(C₂H₄CONHṄ(CH₃)₃) CH₃SO₄⁻ | Red-violet. |
| 2 | CH₃O₂S—[ring]—S—C—NH₂ | Same as above | Do. |
| 3 | O₂N—C(=N)—S—C—NH₂ (HC) | do | Blue. |
| 4 | NC—C(=N)—S—C—NH₂ (HC) | do | Do. |
| 5 | CH₃O₂S—C(=N)—S—C—NH₂ (HC) | do | Do. |
| 6 | [cyclohexyl]—C(N—N)—S—C—NH₂ | Same as above | Red. |
| 7 | O₂N—[ring(CN)(Br)]—NH₂ | do | Violet. |
| 8 | O₂N—[ring(SO₂CH₃)]—NH₂ | do | Red-violet. |
| 9 | [cyclohexyl]—C(=N)—S—C—NH₂ | [ring(CH₃)]—N(C₂H₄OCH₃)(C₂H₄CONHṄ(C₂H₅)₃) C₂H₅SO₄⁻ | Bluish red. |
| 10 | CH₃O₂S—[ring]—S—C—NH₂ | Same as above | Violet. |
| 11 | [cyclohexyl]—C(=N)—S—C—NH₂ | [cyclohexyl]—N(C₂H₄CN)(C₂H₄CONHṄ(CH₃)₃) CH₃SO₄⁻ | Red. |

TABLE 2—Continued

| | I | II | III |
|---|---|---|---|
| 12 | O$_2$N-[bicyclic N,S ring]-C-NH$_2$ | Same as above | Red-violet. |
| 13 | O$_2$N-[phenyl]-CN, NH$_2$ | Same as above | Claret. |
| 14 | NC-[bicyclic N,S ring]-C-NH$_2$ | [phenyl, CH$_3$]-N(C$_2$H$_4$CN)(C$_2$H$_4$CONH$\overset{+}{N}$(CH$_3$)$_3$)·CH$_3$SO$_4^-$ | Ruby. |
| 15 | [phenyl]-C(=N-N=)-S-C-NH$_2$ | Same as above | Red. |
| 16 | O$_2$N-C(=N-CH=)-S-C-NH$_2$ | [phenyl]-N(CH$_2$-[cyclohexyl])(C$_2$H$_4$CONH$\overset{+}{N}$(CH$_3$)$_3$)·CH$_3$SO$_4^-$ | Reddish blue. |
| 17 | Same as above | [phenyl, OC$_2$H$_5$]-N(C$_3$H$_5$)(C$_2$H$_4$CONH$\overset{+}{N}$(CH$_3$)$_3$)·CH$_3$SO$_4^-$ | Blue. |
| 18 | do | [phenyl, NHCOCH$_3$]-N(C$_2$H$_5$)(C$_2$H$_4$CONH$\overset{+}{N}$(C$_2$H$_5$)$_3$)·C$_2$H$_5$SO$_4^-$ | Do. |
| 19 | O$_2$N-[phenyl]-CN, NH$_2$ | Same as above | Violet. |
| 20 | Same as above | [phenyl, CF$_3$]-N(C$_4$H$_9$)(C$_2$H$_4$CONH$\overset{+}{N}$(CH$_3$)$_3$)·CH$_3$SO$_4^-$ | Ruby. |
| 21 | O$_2$N-[phenyl]-Cl, NH$_2$ | [phenyl]-N(C$_2$H$_4$CN)(CH$_2$CONH$\overset{+}{N}$(CH$_3$)$_3$)·CH$_3$SO$_4^-$ | Scarlet. |
| 22 | O$_2$N-C(=N-CH=)-S-C-NH$_2$ | [phenyl]-N(C$_2$H$_4$CN)(C$_2$H$_4$OCONH$\overset{+}{N}$(CH$_3$)$_3$)·CH$_3$SO$_4^-$ | Violet. |
| 23 | O$_2$N-[phenyl]-CN, NH$_2$, Cl | Same as above | Red-violet. |
| 24 | O$_2$N-[phenyl]-NO$_2$, NH$_2$, Br | [naphthyl]-NH$_2$, CONH$\overset{+}{N}$(CH$_3$)$_3$·CH$_3$SO$_4^-$ | Violet. |
| 25 | O$_2$N-[phenyl]-CN, NH$_2$ | Same as above | Red-violet. |

TABLE 2—Continued

| | I | II | III |
|---|---|---|---|
| 26 | O₂N—⟨⟩(Cl)—NH₂ | ...do... | Ruby. |
| 27 | Cl—⟨⟩(NO₂)—NH₂ | ...do... | Red. |
| 28 | O₂N—⟨⟩(SO₂CH₃)—NH₂ | ...do... | Red-violet. |
| 29 | pyridyl-NH₂ | N-methyl cyclohexyl with C₂H₄CONHN⁺(CH₃)₃ C₇H₇SO₃⁻ | Orange. |
| 30 | CH₃—C=N—NH—C(NH₂)=  (triazole) | N-cyclohexyl with C₂H₄OC₂H₄CN and C₂H₄CONHN⁺(C₄H₉)₃ Br⁻ | Reddish-yellow. |
| 31 | CH₃—C=N—N(Ph)—C(NH₂)= | CF₃-cyclohexyl-N(C₂H₅)(C₃H₆CONHN⁺(CH₃)(C₂H₅)₂) I⁻ | Yellow. |
| 32 | Cl—benzimidazole-C—NH₂ | OC₄H₉-cyclohexyl-N(C₂H₄CN)(C₄H₈CONHN⁺(C₂H₅)(CH₃)₂) Cl⁻ | Brown. |

EXAMPLE 7

16.5 Parts of 1-amino-4-nitroanthraquinone-2-carboxylic acid chloride are introduced in portions at 0 to 10°C into a solution of 3.6 parts of N,N-dimethylhydrazine in 150 parts of pyridine and the batch is stirred for 24 hours. The pyridine is evaporated in vacuo, and the residue is neutralized with potassium carbonate solution. The hydrazide which precipitates is isolated by filtration, washed with water and dried.

7.1 Parts of 1-amino-4-nitroanthraquinone-2-carboxylic acid dimethylhydrazide thus obtained are dissolved in 250 parts of dimethylformamide and hydrogenated with Raney nickel as catalyst and hydrogen. The catalyst is removed by filtration and the dimethylformamide is distilled in vacuo. Water is added to the residue, the while is stirred, filtered, and the filter residue is dried.

6.5 Parts of the dried product are dissolved in 85 parts of warm nitrobenzene, and then a solution of 3 parts of dimethyl sulphate in 10 parts of nitrobenzene is added dropwise at about 90°C. The mixture is stirred for 3 hours at 95°C and then cooled. The product which precipitates is isolated by filtration, dissolved in hot water, the solution is clarified by filtration and the dyestuff of the formula

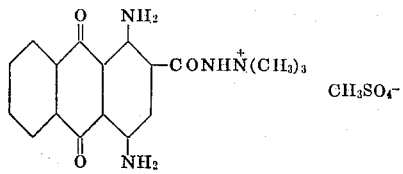

CH₃SO₄⁻ is salted out, isolated by filtration and dried. It dyes polyacrylonitrile fibres blue tints possessing very good properties of fastness.

EXAMPLE 8

6.5 Parts of 1-hydroxy-4-carbomethoxyethylaminoanthraquinone and dissolved in 20 parts of pyridine. 2.1 Parts of hydrazine hydrate are added dropwise at 70°C and the batch is stirred for 24 hours at 100°C. The mixture is cooled and diluted with a 10 percent sodium chloride solution. The product which precipitates is isolated by filtration and dried.

4.9 Parts of the β-4-hydroxy-1-anthraquinonylaminopropionic acid hydrazide obtained as described above are dissolved in 100 parts of warm nitrobenzene and then 4.5 parts of sodium bicarbonate and 4.8 parts by volume of dimethyl sulphate are added at room temperature. The reaction mixture is stirred for 3 hours at room temperature and then for 8 hours at 55°C. The batch is acidified with acetic acid, the nitrobenzene is removed by steam distillation, the residue is dissolved in boiling water and the solution is clarified by filtration. The dyestuff of the formula

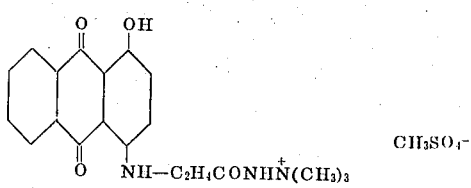

CH₃SO₄⁻ is salted out, isolated by filtration and dried. It dyes polyacrylonitrile fibres violet tints possessing excellent properties of fastness.

Table 3 below lists components for the manufacture of further dyestuffs. The dyestuffs are obtained by quaternating the dyestuff intermediate products listed in Column I with the alkylating agents listed in Column II. The tints produced with the dyestuffs on polyacrylonitrile fibres are indicated in Column III.

TABLE 3

| | I | II | III |
|---|---|---|---|
| 1 | anthraquinone with NHCH$_3$ and NH—C$_6$H$_{10}$—CONHNH$_2$ | (CH$_3$)$_2$SO$_4$ | Greenish blue. |
| 2 | anthraquinone with NHC$_2$H$_4$CONHNH$_2$ and NH—C$_6$H$_{10}$ | (CH$_3$)$_2$SO$_4$ | Do. |
| 3 | anthraquinone with NHC$_2$H$_4$CONHNH$_2$, —OCH$_3$, OH | (CH$_3$)$_2$SO$_4$ | Violet. |
| 4 | H$_2$N, OH, HO, NH—C$_6$H$_{10}$—CONHNH$_2$ anthraquinone | (CH$_3$)$_2$SO$_4$ | Blue. |
| 5 | anthraquinone with NH$_2$, Cl, Cl, NHC$_2$H$_4$CONHN(CH$_3$)$_2$ | (CH$_3$)$_2$SO$_4$ | Violet. |
| 6 | HO, NHC$_2$H$_4$CONHNH$_2$, Br, H$_2$N, OH anthraquinone | (CH$_3$)$_2$SO$_4$ | Blue. |
| 7 | anthraquinone with NH$_2$, CH$_3$, NHC$_2$H$_4$CONHNH$_2$ | (CH$_3$)$_2$SO$_4$ | Reddish blue. |
| 8 | anthraquinone with NH$_2$, CN, NHC$_2$H$_4$CONHNH$_2$ | (CH$_3$)$_2$SO$_4$ | Blue. |
| 9 | anthraquinone with NH$_2$, COCH$_3$, NHC$_2$H$_4$CONHNH$_2$ | (CH$_3$)$_2$SO$_4$ | Do. |

TABLE 3—Continued

| | I | II | III |
|---|---|---|---|
| 10 | (anthraquinone with NH₂, SO₂CH₃, NHC₂H₄CONHNH₂ substituents) | (CH₃)₂SO₄ | Blue |
| 11 | (anthraquinone with NH₂, NO₂, NHC₂H₄CONHNH₂ substituents) | (CH₃)₂SO₄ | Do. |

EXAMPLE 9

9.3 Parts of 4-N-ethyl-N-(2'-hydroxyethyl)-amino-2-methylbenzaldehydebenzoic acid ester, 4.2 parts of cyanoacetic acid dimethylhydrazide, 0.3 part of piperidine and 15 parts of methyl alcohol are boiled for 4 hours under reflux. The reaction mixture is cooled, water is added and the product which precipitates is isolated by filtration, washed with water and dried.

8.4 Parts of the dried product are dissolved in 20 parts of warm chlorobenzene, and then a solution of 3.7 parts of dimethyl sulphate in 10 parts of chlorobenzene is added dropwise at 90°C. The mixture is stirred for 3 hours at 95°C and then cooled. The product which precipitates is isolated by filtration, dissolved in hot water, the solution is clarified by filtration and the dyestuff of the formula

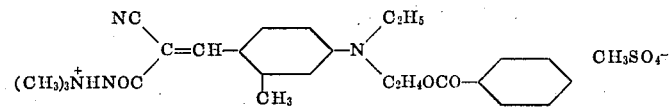

$CH_3SO_4^-$ is salted out, isolated by filtration and dried. It dyes polyacrylonitrile fibres greenish yellow tints possessing good properties of fastness.

Table 4 below lists components for the manufacture of further dyestuffs. The dyestuffs are obtained by quaternating the dyestuff intermediate products listed in Column I with the alkylating agents listed in Column II. The tints produced with the dyestuffs on polyacrylonitrile fibres are indicated in Column III.

EXAMPLE 10

25.6 Parts of 4-chloro-3-nitrobenzenesulphochloride, 18 parts of para-aminobenzoic acid dimethylhydrazide and 80 parts of acetone are stirred at about 40°C. The hydrochloric acid that is liberated is neutralized by the addition of potassium bicarbonate. After condensation, the mixture is diluted with water and the product which precipitates is isolated by filtration. The filter cake, 10.2 parts of aniline, 10 parts of calcium carbonate and 200 parts of alcohol are boiled for 24 hours under reflux. The mixture is filtered while hot and the filter residue is washed with hot alcohol. The filtrate is concentrated until the product crystallizes out.

45.5 Parts of the product obtained as described above dissolved in nitrobenzene are quaternated with 14 parts of dimethyl sulphate for 3 hours at 90° to 95°C. The mixture is then worked up in the manner described in Example 4. The dyestuff of the formula

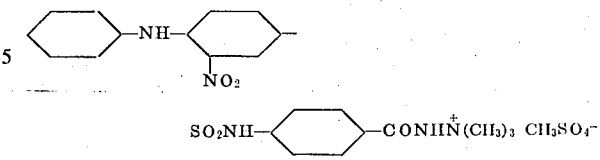

TABLE 4

| | I | II | III |
|---|---|---|---|
| 1 | (NC)(NC)C=CH—(ring with CH₃)—N(C₂H₅)(C₂H₄CONHNH₂) | (CH₃)₂SO₄ | Yellow. |
| 2 | (NC)(C₆H₅-O₂S)C=CH—(ring with OCH₃)—N(C₂H₄OCH₃)(C₃H₆CONHNH₂) | (CH₃)₂SO₄ | Do. |
| 3 | (NC)(H₂NOC)C=CH—(ring with Cl)—N(CH₂-C₆H₅)(C₂H₄CONHN(CH₃)₂) | (C₂H₅)₂SO₄ | Do. | is obtained which dyes polyacrylonitrile fibres yellow tints possessing very good properties of fastness.

TABLE 5

Table 5 below lists components for the manufacture of further dyestuffs. The dyestuffs are obtained by quaternating the dyestuff intermediate products listed in Column I with the alkylating agents listed in Column II. The tints produced with the dyestuffs on polyacrylonitrile fibres are indicated in Column III.

TABLE 5

| | I | II | III |
|---|---|---|---|
| 1 | (CH₃)₂NHNOCH₂CO—⟨⟩—NH—⟨⟩(NO₂)—SO₂NHCH₃ | CH₃I | Yellow. |
| 2 | Cl—⟨⟩—NH—⟨⟩(NO₂)—SO₂NH—⟨⟩—CONHN(C₂H₅)₂ | (C₂H₅)₂SO₄ | Do. |
| 3 | ⟨⟩(CH₃)—NH—⟨⟩(NO₂)—SO₂NH—⟨⟩—CONHN(CH₃)₂ | (CH₃)₂SO₄ | Do. |
| 4 | H₅C₂O—⟨⟩—NH—⟨⟩(NO₂)—SO₂NH—⟨⟩—CONHN(CH₃)₂ | C₆H₅SO₃CH₃ | Do. |

We claim:
1. A water-soluble basic monoazo dyestuff of the formula

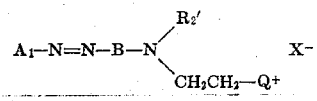

in which
- $A_1$ is phenyl or phenyl substituted by lower alkyl, trifluoromethyl, lower alkoxy, chlorine, bromine, cyano, nitro, lower alkoxycarbonyl, lower alkylcarbonyl, lower alkylsulfonyl, acylamino and sulfonomide,
- B is para-phenylene or para-phenylene substituted chlorine, bromine, lower alkyl, trifluoromethyl, lower alkoxy, acylamino or amino,
- $R_2'$ is lower alkyl, cyanoloweralkyl, loweralkoxyloweralkyl, lower alkanoyloxy-lower alkyl, lower alkylsulphonyloxylower alkyl, aroyloxy-lower alkyl, arylsulphonyloxy-lower alkyl, arylloweralkyl or a residue of the formula

—CH₂CH₂—Q⁺ X⁻,

Q is a quaternated hydrazide group of the formula

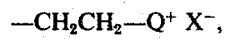

where
- $R_1$ is lower alkyl or hydrogen,
- $R_2$, $R_3$ and $R_4$ each independently is lower alkyl or $R_2$ and $R_3$ are lower alkyl and
- $R_4$ is phenyl or benzyl, and
- X is an anion and where
"acylamino" means lower alkanoylamino, aroylamino, lower alkyl sulfonylamino, arylsulfonylamino, lower alkoxycarbonylamino, ureido and lower alkylureido;

"sulfonamide" means an unsubstituted sulfonic acid amide group or a sulfonic acid amide group substituted by lower alkyl, aryl-loweralkyl or aryl, and "aryl" means unsubstituted phenyl or phenyl substituted by lower alkyl, lower alkoxy, chlorine or bromine and "lower" means containing up to 4 carbon atoms.

2. A water-soluble basic monoazo dyestuff of the formula

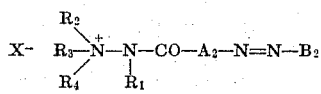

in which
- $A_2$ is phenyl or phenyl substituted by lower alkyl, trifluoromethyl, lower alkoxy, chlorine, bromine, cyano, nitro, lower alkoxycarbonyl, lower alkylcarbonyl, lower alkylsulfonyl, acylamino or sulfonomide,
- $B_2$ is β-aminonaphthyl or phenyl or phenyl substituted by chlorine, bromine, lower alkyl, trifluoromethyl, lower alkoxy or acylamino, which phenyl radical contains in para-position to the azo-group an amino group mono- or di-N-substituted by lower alkyl, aryl, cyano lower alkyl, lower alkoxy-lower alkyl, cyano lower alkoxy-lower alkyl, aryl-lower alkyl, lower alkanoyloxy-lower alkyl, lower alkylsulphonyloxy-lower alkyl, aroyloxy-lower alkyl, arylsulphonyloxy-lower alkyl, lower alkoxycarbonyl-lower alkyl or by the group

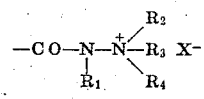

- $R_1$ is lower alkyl or hydrogen,
- $R_2$, $R_3$ and $R_4$ each independently is lower alkyl or $R_2$ and $R_3$ are lower alkyl and
- $R_4$ is phenyl or benzyl and
- X is an anion and where
"acylamino" means lower alkanoylamino, aroylamino, lower alkyl sulfonylamino, arylsulfonylamino, lower alkoxycarbonylamino, ureido and lower alkylureido;

"sulfonamide" means an unsubstituted sulfonic acid amide group or a sulfonic acid amide group substituted by lower alkyl, aryl-loweralkyl or aryl, and "aryl" means unsubstituted phenyl or phenyl substituted by lower alkyl, lower alkoxy, chlorine or bromine and "lower" means containing up to 4 carbon atoms.

3. A water-soluble basic monoazo dyestuff of the formula

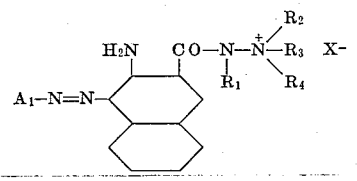

in which
- $A_1$ is phenyl or phenyl substituted by lower alkyl, trifluoromethyl, lower alkoxy, chlorine, bromine, cyano, nitro, lower alkoxycarbonyl, lower alkylcarbonyl, lower alkylsulfonyl, acylamino or sulfonamide
- $R_1$ is lower alkyl or hydrogen,
- $R_2$, $R_3$ and $R_4$ each independently is lower alkyl or
- $R_2$ and $R_3$ are lower alkyl and
- $R_4$ is phenyl or benzyl and
- X is an anion and where "acylamino" means lower alkanoylamino, aroylamino, lower alkyl sulfonylamino, arylsulfonylamino, lower alkoxycarbonylamino, ureido and lower alkylureido;

"sulfonamide" means an unsubstituted sulfonic acid amide group or a sulfonic acid amide group substituted by lower alkyl, aryl-loweralkyl or aryl, and "aryl" means unsubstituted phenyl or phenyl substituted by lower alkyl, lower alkoxy, chlorine or bromine and "lower" means containing up to 4 carbon atoms.

4. An azo dyestuff which corresponds to the formula

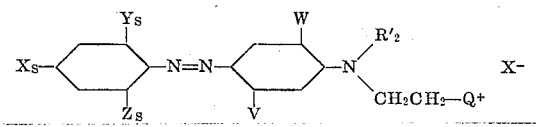

in which
- $X_S$ represents hydrogen, chlorine, bromine, cyano, lower alkoxycarbonyl, lower alkylcarbonyl, lower alkylsulfonyl, sulfonamide, or nitro,
- $Y_S$ represents hydrogen, chlorine, bromine, nitro, lower alkyl, lower alkoxy, trifluoromethyl, lower alkoxycarbonyl, lower alkylcarbonyl or cyano and
- $Z_S$ represents hydrogen, chlorine or bromine, and in which at least one of the residue $X_S$ and $Y_S$ represents chlorine, bromine, nitro, lower alkylcarbonyl, lower alkoxycarbonyl, cyano, lower alkylsulfonyl, or sulfonamide,
- V represents hydrogen, chlorine, bromine, lower alkyl, lower alkoxy or acylamino,
- W represents hydrogen, lower alkyl or lower alkoxy,
- $R_2'$ represents lower alkyl, cyanoloweralkyl, loweralkoxy-loweralkyl, lower alkanoyloxy-lower alkyl, lower alkylsulphonyloxy-loweralkyl, aroyloxy-lower alkyl, arylsulphonyloxy-loweralkyl, arylloweralkyl or a residue of the formula $$-CH_2CH_2-Q^+\ X^-$$

Q is a quaternated hydrazide group of the formula

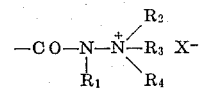

where
- $R_1$ is lower alkyl or hydrogen,
- $R_2$, $R_3$ and $R_4$ each independently is lower alkyl or
- $R_2$ and $R_3$ are lower alkyl and
- $R_4$ is phenyl or benzyl and
- X is an anion and where "acylamino" means lower alkanoylamino, aroylamino, lower alkyl sulfonylamino, arylsulfonylamino, lower alkoxycarbonylamino, ureido and lower alkylureido;

"sulfonamide" means an unsubstituted solfonic acid amide group or a sulfonic acid amide group substituted by lower alkyl, aryl-loweralkyl or aryl, and "aryl" means unsubstituted phenyl or phenyl substituted by lower alkyl, lower alkoxy, chlorine or bromine and "lower" means containing up to 4 carbon atoms.

5. A dyestuff as claimed in claim 4, wherein $R_1$ is hydrogen and $R_2$, $R_3$ and $R_4$ each represents methyl.

6. A dyestuff as claimed in claim 4 of the formula

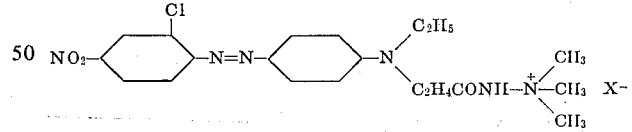

* * * * *